United States Patent [19]
Orchard et al.

[11] Patent Number: 5,418,683
[45] Date of Patent: May 23, 1995

[54] TEMPORARY POWER CENTER FOR CONSTRUCTION SITE

[75] Inventors: Ronald J. Orchard; Darrel A. Holtz, both of Mankato, Minn.

[73] Assignee: General Electric Company, New York, N.Y.

[21] Appl. No.: 192,514

[22] Filed: Feb. 7, 1994

[51] Int. Cl.[6] .............................................. H02B 1/00
[52] U.S. Cl. ...................................... 361/672; 361/663
[58] Field of Search ......................... 174/37, 38, 39; 361/663–673, 634, 652

[56] References Cited

U.S. PATENT DOCUMENTS

| | | |
|---|---|---|
| 1,296,323 | 3/1919 | Sachs .................................... 361/665 |
| 3,716,762 | 2/1973 | Shrader . |
| 3,906,295 | 9/1975 | Tessmer ................................ 361/663 |
| 4,025,825 | 5/1977 | Shrader . |

*Primary Examiner*—Gregory D. Thompson

[57] ABSTRACT

A single unit enclosure containing an electric power meter compartment and a power receptacles compartment for use on a temporary construction site employing either underground or overhead utility cables. The meter compartment is located under the power receptacles compartment and is protected from the environment by means of the overhang provided by the access door attached to the power receptacles compartment. The incoming power cables to the enclosure are also protected by means of the access door overhang.

6 Claims, 4 Drawing Sheets

TEMPORARY POWER CENTER FOR CONSTRUCTION SITE

BACKGROUND OF THE INVENTION

Power centers in the form of an exterior enclosure containing an electric power meter superjacent a power receptacles enclosure are commonly-used at temporary construction sites to supply electric power and to insure that the power is metered. In the past, most electric power to the sites was supplied by overhead utility power cables which required the meter to be installed on the top part of the enclosure. U.S. Pat. Nos. 3,716,762 and 4,025,825 describe such enclosures.

The advent of the large number of underground utility cables to such construction sites has resulted in the use of a separate meter assembly connecting with the underground service cables and a separate power receptacles enclosure connected with the separate meter assembly. State and local electrical codes prohibit the incoming utility cables to be bent in a reverse direction as required with the use of earlier power centers. U.S. patent application Ser. No. 08/188,973 filed Jan. 31, 1994 entitled "Temporary Power Center for Construction Site" describes a power center that is adapted for connection with underground utility cables.

Since new construction sites are currently provided with either overhead utility cables or underground utility cables, it would be economically feasible to provide a single power center design that is connectable with both overhead as well as underground utility cables without requiring modification either at the point of manufacture or at the assembly site.

One purpose of the invention is to provide a single power center unit that is capable of being electrically connected with either overhead or underground utility power cables with little or no modification.

SUMMARY OF THE INVENTION

A power center for temporary construction sites allows connection directly with an electric power meter and associated electric power receptacles by means of underground service cables as well as overhead service cables. In one arrangement a separate channel is provided in the power receptacle compartment to allow overhead utility cables to extend within the meter compartment. Another arrangement employs a movable barrier interfaced between the two compartments to prevent access to the meter compartment after the meter has been installed. The arrangement of the power meter under the receptacle compartment protects the power meter from severe environmental conditions.

DESCRIPTION OF THE PREFERRED EMBODIMENT

Figure 1:
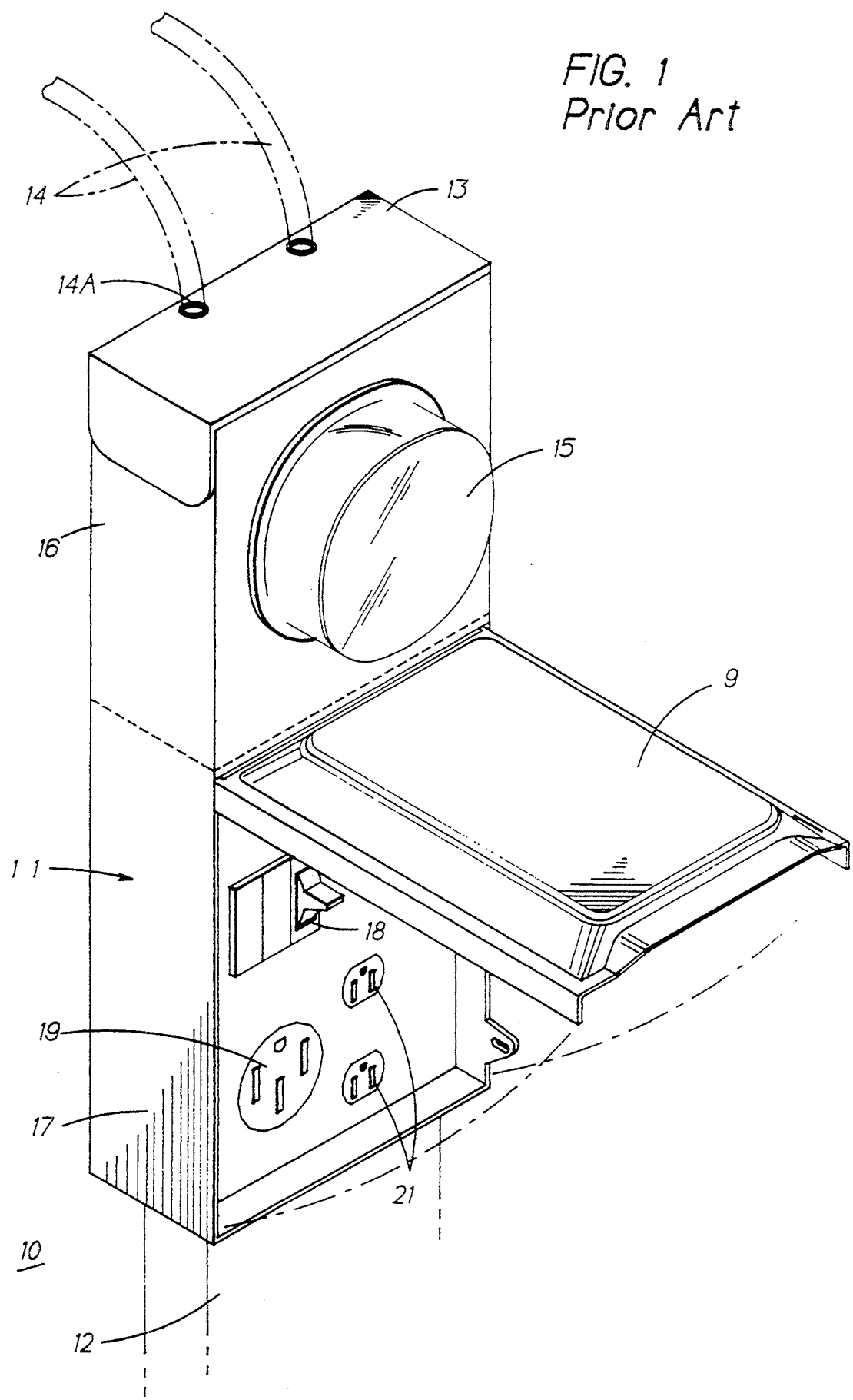
FIG. 1 is a top perspective view of a temporary construction site power center according to the Prior Art.

Before describing the load center of the invention it is helpful to review a load center 10 such as shown in FIG. 1 that is commonly used with temporary construction sites. The arrangement is similar to that described within the aforementioned U.S. Pat. Nos. 3,716,762 and 4,025,825 wherein a metallic housing 11 is fastened to a post 12 at the construction site and is connected with the overhead utility power cables 14 through openings 14A in the top cover 13. To facilitate connection with the power meter 15, the meter compartment 16 which houses the meter, is arranged over the power receptacles compartment 17 which houses the circuit breaker 18, high voltage outlet 19 and residential voltage outlets 21. The access door 9 to the power receptacles compartment is depicted in its fully-open position.

Figure 2:
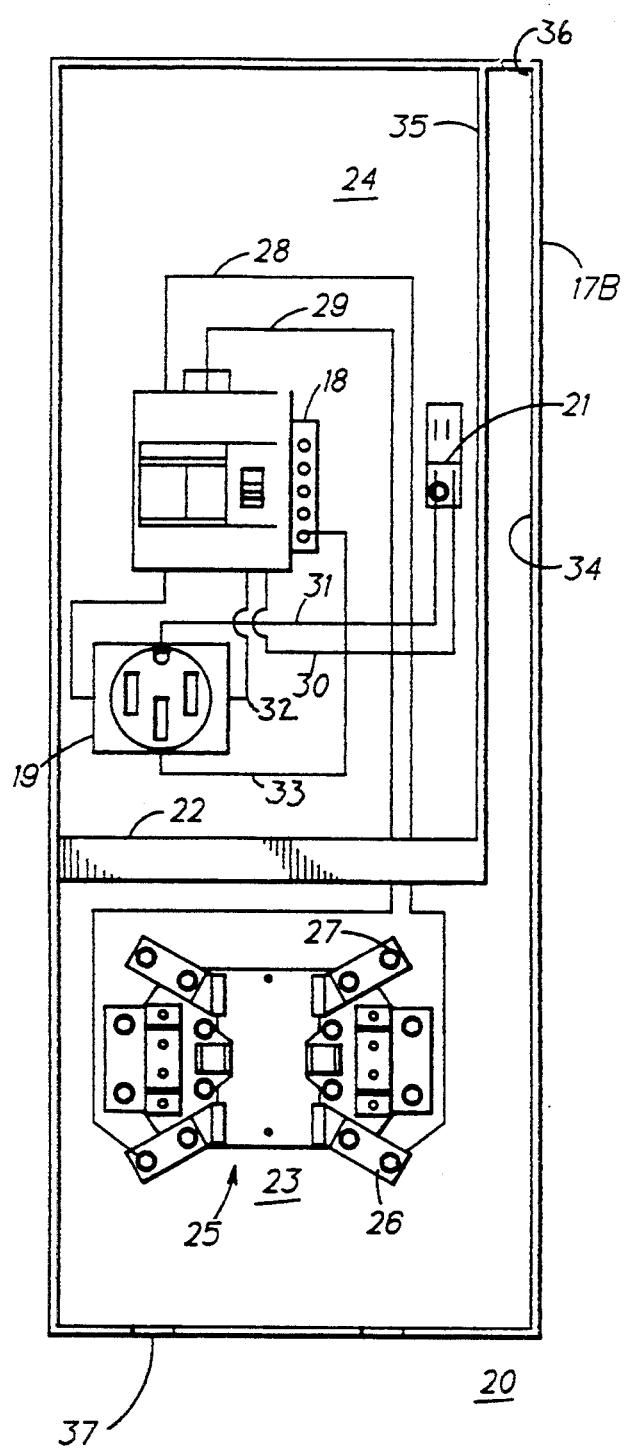
FIG. 2 is a front plan view of one embodiment of the load center according to the invention with the power receptacle compartment door and meter compartment plate removed to depict the interiors thereof.
Figure 2A:
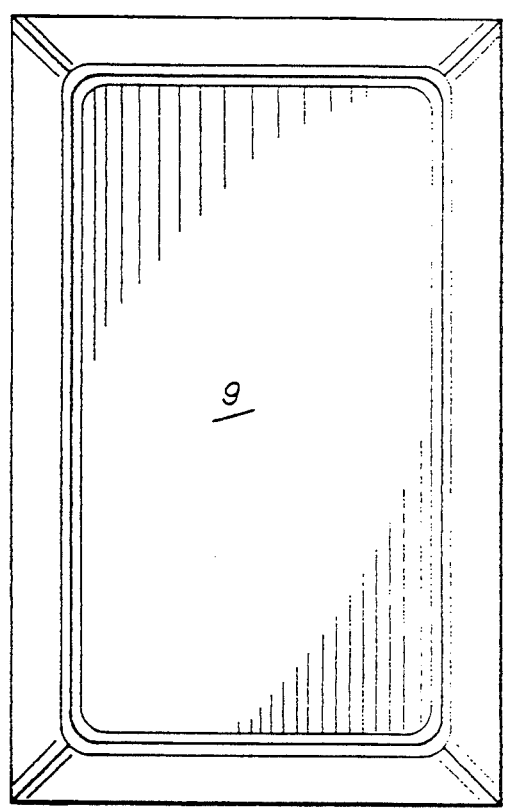
FIGS. 2A and 2B are front plan views of the power receptacle compartment door and meter compartment plate respectively.
Figure 2B:
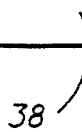

One power center 20 according to the invention which is adaptable for connection to either overhead or underground utility cables, hereinafter "adaptable load center" is shown in FIGS. 2, 2A and 2B and contains a lower meter compartment 23 hereinafter "lower compartment" which houses the meter socket 25. The meter socket connects with the external utility cables by means of a first pair of terminals 27 and with the circuit breaker 18 in the upper power receptacles compartment 24, hereinafter "upper compartment" by means of the second pair of terminals 26 and the conductors 28,29. Openings 37 through the bottom of the lower compartment 23 allow connection between underground utility cables and the terminals 27. The conductors 28, 29 interconnecting the upper and lower compartments pass under the metallic barrier 22 that prevents access to the lower compartment 23 from the upper compartment 24 to deter tampering with the meter connections. The high voltage outlet 19 connects with the load side of the circuit breaker 18 by means of conductors 32,33. Electrical connection between the high voltage outlet 19 and the residential voltage outlet 21 is made by means of conductors 30,31. To provide alternate connection with the meter terminals 27 by means of overhead utility cables, a wiring channel 34 is arranged on the side of the upper compartment 24 by means of a partition 35 and the upper compartment sidewall 17B. The partition 35 blocks access to the wiring channel to prevent tampering with the utility cables that enter the channel by means of the top access slot 36. When the utility cables are connected to the meter terminals 27, the apertured plate 38 shown in FIG. 2B is positioned over the meter (not shown) and is secured to the lower compartment and the meter face extends through the central opening 39 for visual access. The door 9 shown in FIG. 2A is hingeably arranged over the upper compartment to allow external access to the components contained therein.

Figure 3:
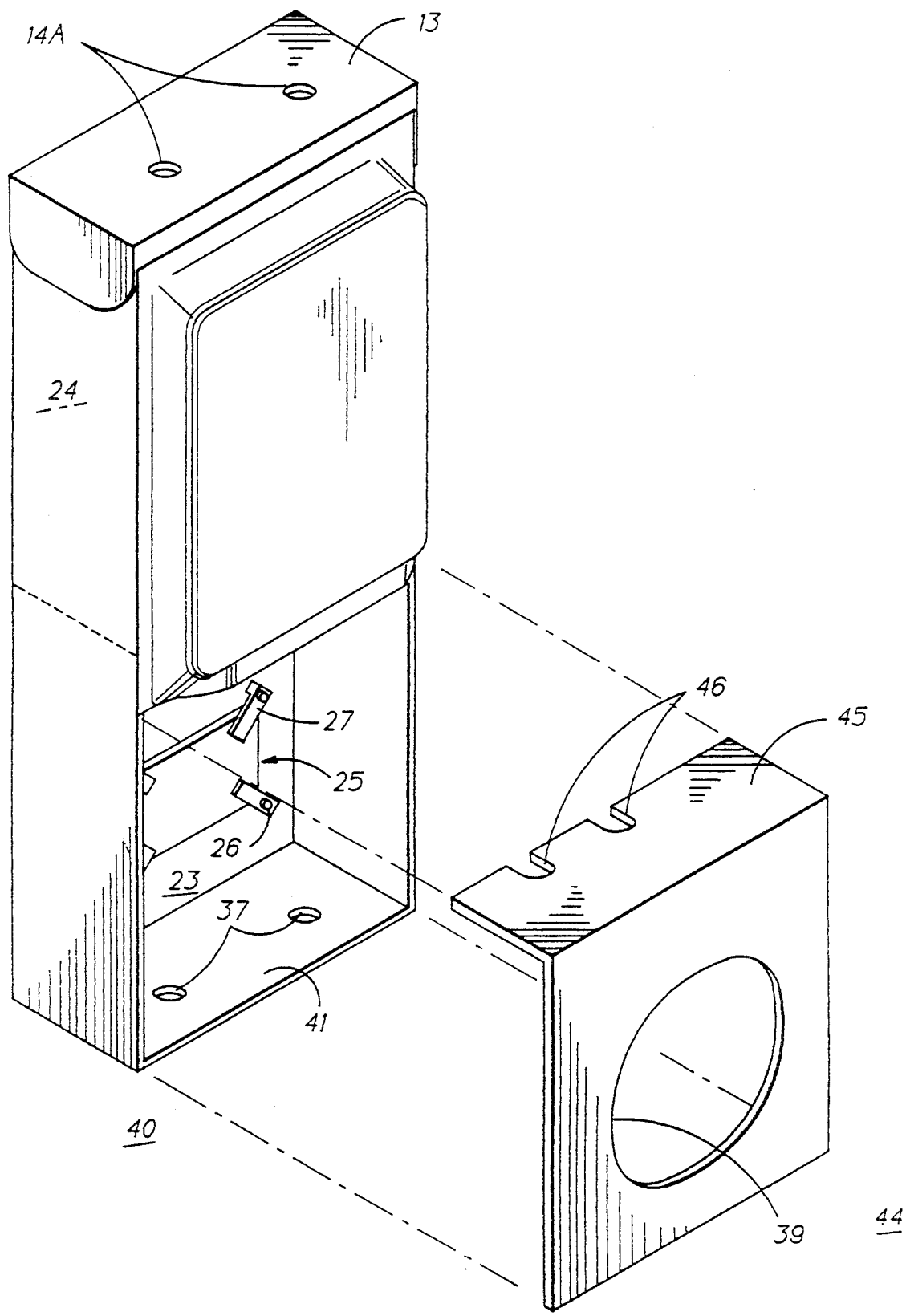
FIG. 3 is top perspective view of a further embodiment of the load center of the invention with the meter compartment plate in isometric projection.

A further adaptable power center 40 is depicted in FIG. 3 and includes a similar pair of top access openings 14A through the top 13 as the power center 10 of FIG. 1 to allow direct connection between the overhead utility cables and the terminals 27 on the meter socket 25 within the lower compartment 23 when the shaped meter cover plate 44 is not attached to the load center and there is a clear passage between the lower and upper compartments 23,24. The function of the barrier 22 of FIG. 2 which separates the upper and lower compartments is provided by the top 45 of the shaped meter plate 44 when the shaped meter plate is later attached to the load center. The electrical conductors 28,29 of FIG. 2 that interconnect the meter terminals with the circuit breaker 18 pass through the slots 46 formed within the top 45 when the shaped meter plate 44 is attached to the power center. Connection with the meter terminals 27 and underground utility cables is made by passing the utility cables through the openings 37 formed on the bottom 41 of the lower compartment 23. The shaped meter plate 44 is attached to the power center 40 by the utility serviceman when the electric is meter is installed. The shaped meter plate is then sealed by the utility serviceman against unauthorized removal of the meter plate or the electric meter. The meter face extends through the central opening 39 for visual access.

Figure 4:
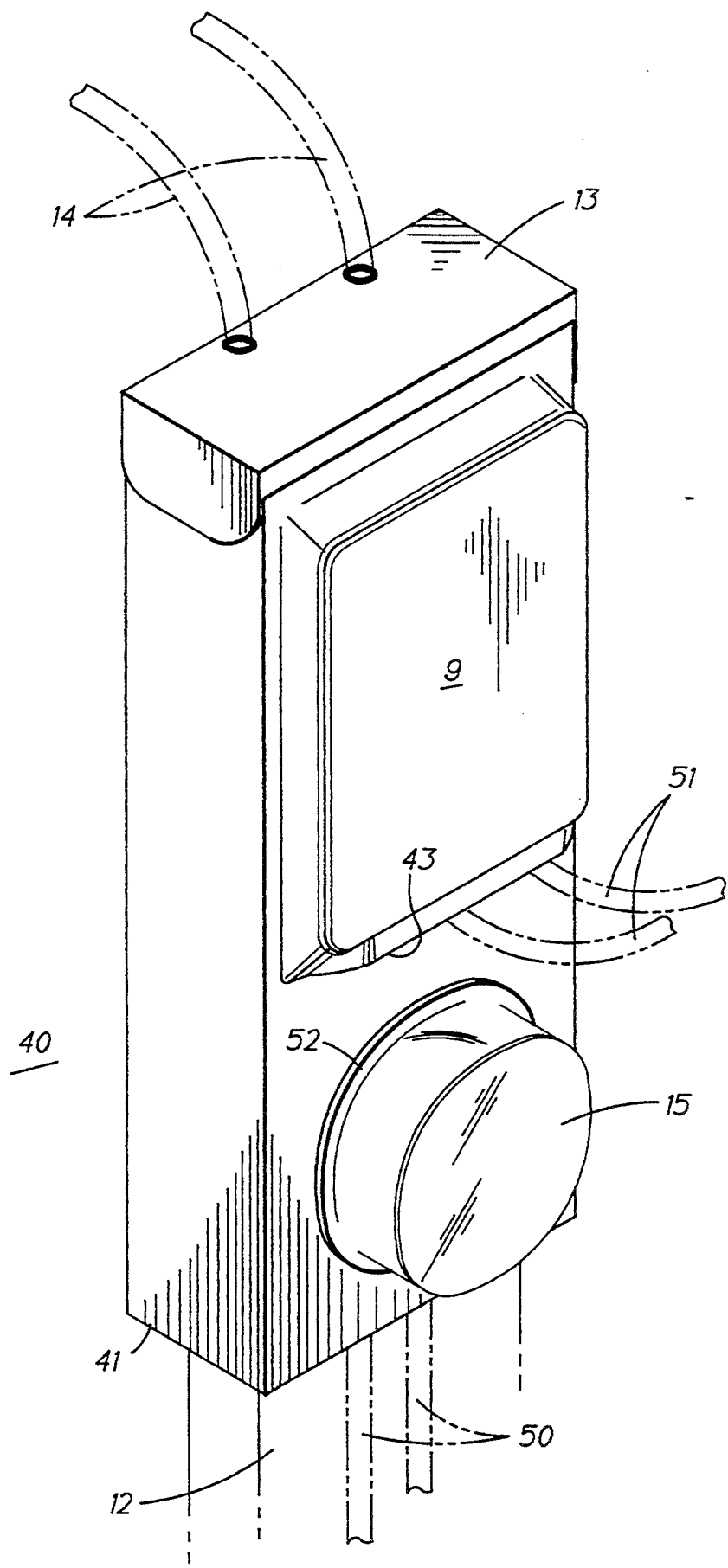
FIG. 4 is top perspective view of the load center of FIG. 4 optionally-connected with either underground or overhead utility conductors.

The adaptive power center 40 is shown in FIG. 4 attached to the support post 12 to illustrate the possible connection with overhead utility cables 14 through the top 13 as well as the possible connection with underground utility cables 50 as shown in phantom through the bottom 41. The overhang 43 on the bottom of the door 9 serves to provide some environmental protection to the power take-off cables 51 exiting from the bottom of the door as well the perimetric seal 52 around the bottom of the meter 15 as described in the aforementioned U.S. patent application Ser. No. 08/188,973 filed Jan. 31, 1994.

We claim:

1. An adaptive load center for temporary utility power connection comprising:

an elongated enclosure;

a hingeably-mounted door arranged over a top part of said enclosure, said top part defining a power receptacle compartment;

a circuit breaker within said power receptacle compartment electrically connected with at least one power receptacle;

an electric power meter within a meter compartment subjacent said power receptacle compartment, said meter being electrically connected in series with said circuit breaker and arranged for electrical connection with an overhead utility cable; and a meter plate comprising a planar front defining and aperture for visual access to said electric meter, and a top part extending from said front, said top extending within said meter compartment when said meter plate is attached to said enclosure to thereby prevent access to said meter compartment from said power receptacle compartment.

2. The adaptive load center of claim 1 wherein said power receptacle compartment includes first means for accessing an overhead utility cable.

3. The adaptive load center of claim 2 wherein said meter compartment includes second means for accessing an underground utility cable.

4. The adaptive load center of claim 2 wherein said first access means comprises an opening on a top part of said power receptacle compartment.

5. The adaptive load center of claim 4 wherein said second access means comprises an opening on a bottom part of said meter compartment.

6. The modular load center of claim 1 whereby said enclosure is oriented in a vertical plane to thereby locate said power receptacle compartment over said meter compartment so that a front part of said door extends over a part of said meter.

* * * * *